Nov. 19, 1935. A. A. WESCOTT 2,021,821
LAWN MOWER RAKE ATTACHMENT
Filed Nov. 23, 1934
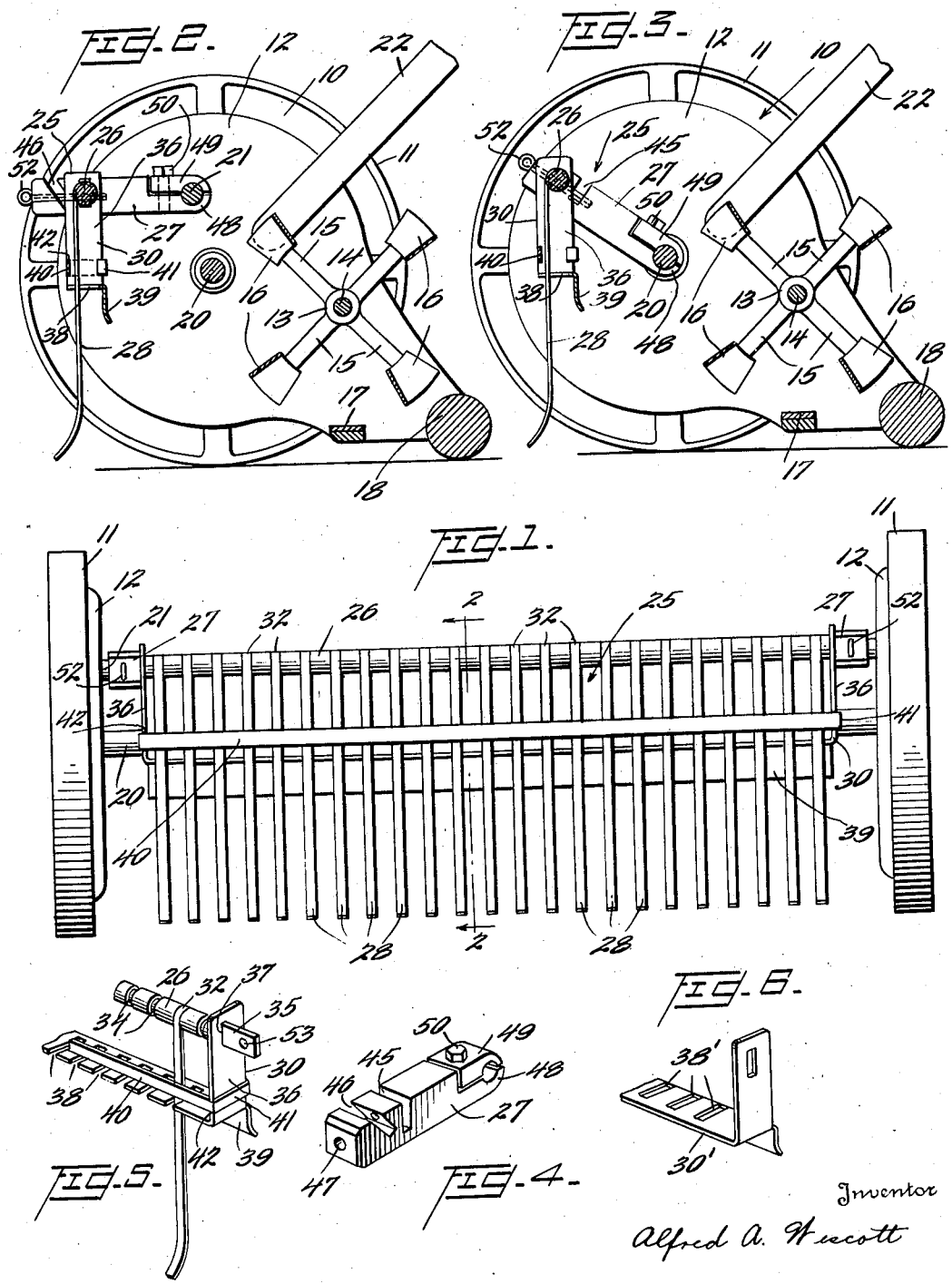

Patented Nov. 19, 1935

2,021,821

UNITED STATES PATENT OFFICE 2,021,821

LAWN MOWER RAKE ATTACHMENT

Alfred A. Wescott, Elmira, N. Y.

Application November 23, 1934, Serial No. 754,527

9 Claims. (Cl. 56—294)

This invention relates to lawn mowers and more particularly to rake attachments therefor.

One of the greatest hindrances encountered in maintaining a well-trimmed and attractive lawn has been the pernicious persistence of the growth of crab grass and other creeping grasses, vines and weeds which are of a low habit of growth, spread laterally, and eventually choke or exterminate the more erect and desirable grasses.

Due to the low growth and bushy nature of some of these grasses, the ordinary lawn mower rides over them ineffectively or, at best, merely shears off a portion of the leaves or blades which may protrude upwardly from the main stems which lie closely to the ground. It has been proposed to employ rake attachments in connection with the lawn mower forwardly of the cutting blades for the purpose of combing out the matted growth of these creeping grasses and lifting the stems thereof in order to present them properly to the blades to be cut.

The object of the invention, generally stated, is to provide a novel and improved attachment of this character.

More specifically, it is an object of the invention to provide rake attachments for application to lawn mowers of various conventional types, and embodying securing means whereby they may be connected to the mowers at different points determined by convenience or variation in design.

Another object of the invention is the provision of a rake attachment of the indicated type involving a novel construction and assembly of the supporting framework of the attachment and the teeth or tines whereby the latter may function properly and be protected from breakage, no matter which of the available attaching means is employed. Provision is also made whereby the tines may be readily replaced if broken through rough usage or exceptional circumstances of operation.

In its preferred embodiment, the invention contemplates the provision of a rake attachment which is especially adapted for use with lawn mowers of the type which employ rotating reels comprising a series of spirally formed blades each of which successively cooperates with a stationary horizontal blade. Mowers of this type are usually provided with stationary or dead axles accessible near their ends for attachment of the rake device, or are provided with cross bars or tie rods extending from one of the gear housings on either side of the mower to the other, and generally disposed above the axle and sometimes slightly forwardly thereof. In some mowers, both of these means are at the disposal of the operator for securing the attachment to the machine.

My novel attachment, therefore, may embody means for alternatively securing the tooth carrying frame to either of these elements, while at the same time maintaining the same angular relation of the teeth or tines with respect to the surface of the lawn. Means are also associated with the frame of the attachment for providing a relatively low bearing for the somewhat elongated tines which materially reduces the chance of breakage so prevalent in devices in which the tines are anchored only at their extreme upper ends. This means, however, permits sufficient flexing of the tines to effectively perform their functions and also allows a slight pivotal movement which aids in the safe operation of the device.

Other objects and features of novelty will be apparent from the following specification when read in connection with the accompanying drawing in which certain embodiments of my invention are illustrated by way of example.

In the drawing:

Figure 1 is a fragmentary view in front elevation of a lawn mower in which my novel attachment is secured to the tie bar;

Figure 2 is a view in longitudinal vertical section of the embodiment illustrated in Figure 1 taken on line 2—2 of that figure;

Figure 3 is a longitudinal cross sectional view similar to Figure 2 showing the attachment applied to the axle of the mower;

Figure 4 is a detail perspective view of one of the brackets by means of which the attachment is fastened to the mower;

Figure 5 is a fragmentary view in perspective of one form of rake frame showing the means for movably carrying the tines; and Figure 6 is a fragmentary view similar to Figure 5 illustrating an alternative embodiment of the tine supporting frame.

The lawn mower to which the attachment is applied may be of any conventional variety but is illustrated in the drawing as of the rotating cutting reel type. The mower is designated generally by the numeral 10 and is provided with two wheels 11 which, through suitable gearing encased in the housing 12, drive the rotating reel 13 which comprises the axle 14, arms 15 and spirally formed blades 16. These blades cooperate with the stationary blade 17 to cut the grass, the blade 17 being disposed at various heights by means of the usual vertically adjustable roller 18. The axle of the mower is shown at 20 and the conventional tie rod 21 extends from the gear housing at one side of the mower to the other. A handle 22 is secured to the mower in any suitable or convenient way.

The novel rake attachment provided by my invention is indicated by the reference numeral 25 and comprises a cross bar 26 which carries at its ends brackets 27 of a special design and which serves to support at numerous points along its length the depending and substantially vertical tines 28. A rigid frame 30 also depends from the cross bar 26 and cooperates with the tines 28 in maintaining the latter in proper operative position and protecting them against breakage and undue wear.

The tines 28 are preferably curved forwardly at their lower ends and are provided with spring loops 32 at their upper ends whereby they may be snapped into position about the cross bar 26 and disposed snugly within the annular grooves 34 formed in the bar. These grooves are convenient means for spacing the tines at equal intervals along the bar, but other suitable spacing means may be employed within the scope of the invention.

The cross rod 26 is provided with squared ends as at 35 adapted to receive the depending framework 30. This framework is provided with upwardly extending arms 36 at each end, each having rectangular holes 37 formed therein through which the squared ends 35 extend. The framework 30 is provided with spaced notches or slots 38 arranged at intervals corresponding to the spacing of the grooves 34 in the cross bar 26 and are adapted to receive the intermediate portions of the tines 28. The rear edge of the frame 30 is provided with a depending skirt or flange 39 which is curved slightly to provide a rear bearing for the tines. Extreme forward movement of the tines out of the slots or notches 38 is prevented by a retaining strap 40 which is provided at its end with arms 41 adapted to be bent around the end pieces 36 of the frame and disposed in notches 42 cut in this end piece.

The attaching brackets 27 are of the general configuration suggested by the perspective view in Figure 4. A vertical kerf 45 is cut in the bracket near its forward end and between this vertical kerf 45 and the extreme front end of the bracket is formed a diagonal notch or kerf 46 which is inclined downwardly and rearwardly at an angle of approximately 45°. A hole 47 is drilled into the bracket 27 from the forward end thereof and arranged to intersect the kerfs 45 and 46. The rear end of each bracket 27 is formed with a stationary clamping jaw 48 and a removable clamping jaw 49, the jaws being operated by the bolt or screw 50.

In applying the attachment to the mower by means of the brackets 27, the squared ends 35 of the cross bar 26 of the attachment are disposed in the kerfs 45 in the event that the attachment is to be secured to the tie rod 21 of the mower or in the inclined kerfs 46 if the connection is to be made to the axle 20. The former arrangement is illustrated clearly in Figure 2 of the drawing and the latter in Figure 3. The clamping jaws 48 and 49 are adapted to receive either the tie rod 21 or the axle 20 and be rigidly secured thereto. It will be noted that the length of the tines 28 is approximately the same as the vertical height of the tie rod 21 from the ground and thus in the arrangement shown in Figure 2 the brackets 27 are approximately horizontal. In the embodiment shown in Figure 3 wherein the bracket is clamped to the axle 20, the tines are disposed in substantially the same vertical position, but the brackets 27 are inclined downwardly and rearwardly toward the lower positioned axle. The angularity of the kerf 46 is such that this relative angular position of the bracket and tines may be maintained. A cotter pin or equivalent securing means 52 is positioned in the bore 47 and passes through the aligned kerfs 45 and 46 and also through the perforation 53 formed in the squared end 35 of the cross bar 26.

In Figure 6 there is illustrated an alternative construction of the framework which is designated 30'. In this arrangement, openings 38' are formed in the horizontal body portion of the frame instead of open notches or slots as in the previously described embodiment. This arrangement dispenses with the strap 40 and permits a simpler construction. In applying the tines 28 to the attachment the lower ends thereof may be inserted through the openings 38' and then their upper looped ends may be snapped over the cross bar 26.

In operation, as the lawn mower is pushed forwardly across the lawn the tines 28 serve to comb out and lift the creeping grasses to a more vertical position so that they may be cut by the blades 16 and 17. During this movement the tines 28 may be moved rearwardly until they contact with the curved skirt 39 which will limit the rearward pivotal movement of the tines but will permit a further flexing under greater stress without danger of breakage. A reversal of the direction of operation of the mower may move the tines forwardly, but this movement will be limited by the strap 42 in one embodiment and by the forward edges of the openings 38' in the other. In case of accidental breakage of a tine it may be removed and replaced very readily by releasing the loop 32 from the rod 26 and snapping another tine in its place.

In order to be adapted to lawn mowers having wheels of varying heights, the attachment may be swung slightly about the axle 20 or tie rod 21 and the bracket clamp adjusted to suitable positions. This slight adjustment will not alter the substantially vertical positions of the tines to any great extent so as to interfere with the efficiency of the device.

It will be understood that various changes and modifications can be made in the embodiments illustrated and described herein without departing from the scope of the invention as defined in the following claims.

Having thus described the invention, what is claimed as new and desired to be secured by Letters Patent is:

1. In combination with a lawn mower, a rake attachment including tines, means for maintaining said tines at a predetermined angularity with respect to the ground, said means including a pair of brackets one at each side of said attachment means on said brackets for mounting said tines with provision for angular adjustment between said tines and said brackets, attaching means on each bracket for alternatively securing the attachment to different portions of the mower without substantially altering said angularity.

2. In combination with a lawn mower having wheels, an axle and a conventional tie bar, said tie bar and axle being normally disposed at different heights, a rake attachment including tines, means for mounting said tines at a predetermined angularity and distance from the ground, said means including brackets each being provided with means for mounting said tines thereon in different angular positions with relation to said brackets and attaching means on each of said brackets for alternatively securing the attachment to said axle or to said tie bar, whereby the angularity and distance from the ground of said tines will not be substantially altered by the transfer from one point of attachment to the other.

3. In combination with a lawn mower, a rake attachment comprising a frame, tines secured thereto, and supporting brackets; kerfs formed in each of said brackets, disposed at different angles therewith, a portion of said frame selectively and non-rotatively received within said kerfs and attaching means on each of said brackets for securing them to different portions of the mower while maintaining its proper operative position.

4. In combination with a lawn mower, a rake attachment comprising a frame, tines secured thereto, and supporting brackets; said frame including a cross rod having squared ends, kerfs formed in said brackets, extending at different angles therewith, and adapted to receive said squared ends, retaining means for said ends associated with said brackets, and clamping means for alternatively securing said bracket to different portions of said mower.

5. In combination with a lawn mower, a rake attachment comprising a cross bar, substantially vertically extending tines each pivotally attached to said cross bar, a downwardly extending framework suspended from said cross bar, said framework including a cross member slotted for the reception of the tines at points intermediate their length, the slots being elongated in the direction of movement of the mower for permitting limited pivotal movement.

6. In combination with a lawn mower, a rake attachment comprising a cross bar, substantially vertically extending tines each pivotally attached to said cross bar, a downwardly extending framework suspended from said cross bar, said framework including a cross member slotted for the reception of the tines at points intermediate their length, the slots being elongated in the direction of movement of the mower for permitting limited pivotal movement, and a curved plate associated with said cross member for backing up the tines and permitting the necessary amount of flexure.

7. A rake attachment for application to lawn mowers having elements for the connecting thereto of said rake attachment at different heights from the ground, said rake attachment comprising, in combination, a frame, tines secured thereto, and a supporting bracket extending from said frame, means for selectively securing said bracket to said elements on the mowers; alternative connections between said frame and bracket for selective use depending upon the height of the mower element to which the attachment is secured, said connections affording means whereby substantially the same angularity of said tines and distance from the ground thereof may be maintained and comprising kerfs formed in said bracket and disposed at different angles thereto and selectively and non-rotatably receiving a portion of the frame.

8. A rake attachment for lawn mowers comprising, in combination, a frame, tines secured thereto and a supporting bracket; means on said bracket for securing it to said frame so as to extend at an angle thereto, alternative means on said bracket spaced from said first named means for securing it to said frame at a different angle thereto, and clamping means for alternatively securing said bracket to different portions of said mowers.

9. A rake attachment for lawn mowers comprising, in combination, a frame, tines secured thereto, and a supporting bracket for connecting said attachment to a mower at any of a plurality of points at different heights from the ground; mutually cooperating means on said frame and said bracket respectively for adjustably and substantially rigidly connecting said frame and bracket, those of said means which are on the bracket comprising spaced means each to connect said bracket to said frame at a different angle depending upon the height of the point of connection to the mower, whereby the working angle and height of said rake attachment may be maintained.

ALFRED A. WESCOTT.